United States Patent
Ong et al.

(10) Patent No.: US 7,130,263 B1
(45) Date of Patent: Oct. 31, 2006

(54) HETEROGENEOUS CONNECTIONS ON A BI-DIRECTIONAL LINE SWITCHED RING

(75) Inventors: Lawrence Ong, Coquitlam (CA); James C. Pang, Vancouver (CA); Ning He, Richmond (CA)

(73) Assignee: Redback Networks Inc., San Jose, CA (US)

( * ) Notice: Subject to any disclaimer, the term of this patent is extended or adjusted under 35 U.S.C. 154(b) by 914 days.

(21) Appl. No.: 09/821,981

(22) Filed: Mar. 31, 2001

(51) Int. Cl.
*G01R 31/08* (2006.01)

(52) U.S. Cl. .......................... 370/223; 370/227; 398/4
(58) Field of Classification Search ................ 370/217, 370/222, 223, 225, 227, 228, 221, 358, 539; 714/3, 717; 340/3.43, 3.44
See application file for complete search history.

(56) References Cited

U.S. PATENT DOCUMENTS

| | | | |
|---|---|---|---|
| 5,159,595 A | | 10/1992 | Flanagan et al. |
| 5,406,401 A | * | 4/1995 | Kremer .......................... 398/4 |
| 5,517,489 A | * | 5/1996 | Ogura .......................... 370/223 |
| 5,600,631 A | * | 2/1997 | Takatori et al. ............. 370/217 |
| 5,745,476 A | * | 4/1998 | Chaudhuri .................. 370/222 |
| 5,815,490 A | * | 9/1998 | Lu .............................. 370/223 |
| 5,826,038 A | | 10/1998 | Nakazumi |
| 6,122,250 A | | 9/2000 | Taniguchi |
| 6,400,859 B1 | * | 6/2002 | de Boer et al. ............... 385/24 |
| 6,606,297 B1 | * | 8/2003 | Magill et al. ................. 370/216 |
| 6,606,667 B1 | * | 8/2003 | Hermann ..................... 709/239 |
| 6,657,952 B1 | * | 12/2003 | Shiragaki et al. ........... 370/223 |
| 6,683,849 B1 | * | 1/2004 | Langridge et al. .......... 370/223 |
| 6,977,889 B1 | * | 12/2005 | Kawaguchi et al. ........ 370/228 |
| 7,016,357 B1 | * | 3/2006 | Wellbaum et al. ..... 370/395.51 |

OTHER PUBLICATIONS

GR-1230-CORE, SONET Bidirectional Line-Switched Ring Equipment Generic Criteria, Bellcore, Issue 4, Dec. 1998.*
GR-253-CORE, Synchronous Optical Network (SONET) Transport Systems: Common Generic Criteric, Telcordia Technologies, Issue 3, Sep. 2000.*
GR-253-CORE, Synchronous Optical Network (SONET) transport systems: common generic criteria, Sep. 2000, Telcordia Technologies (formally Bellcore), issue 3, sections 3.*
Redback Networks SmartEdge 800, Multi-service optical platform for metropolitan networks (6 pgs).
NetOp Network and Node Manager Operations Guide, Release 1.2, Part No. 220-0178-01, Order No. TPSW-NOM 1.2, Redback Networks (119 pgs).

* cited by examiner

*Primary Examiner*—Doris H. To
*Assistant Examiner*—Ian N. Moore
(74) *Attorney, Agent, or Firm*—Blakely, Sokoloff, Taylor & Zafman LLP

(57) ABSTRACT

In one embodiment, a network element is to be coupled to a first and second span of a number of spans that interconnect a set of network elements to form a ring network. In addition, each of the spans has two sub-spans on which traffic travels in opposite directions on a number of channels that circumvent the ring. Additionally, the channels on each sub-span include working channels and protecting channels. Furthermore, the network element includes a traffic handler to reprogram, responsive to protection switches and un-switches, the connection configuration on the protecting channels of the sub-spans of the first and second spans that provide traffic to the network element.

13 Claims, 10 Drawing Sheets

HETEROGENEOUS CONNECTIONS ON A BI-DIRECTIONAL LINE SWITCHED RING

CROSS-REFERENCE TO RELATED APPLICATIONS

Not Applicable.

BACKGROUND OF THE INVENTION

1. Field of the Invention

This invention relates to communication networks. More specifically, the present invention relates to communication over optical networks.

2. Background of the Invention

Various topologies can be used in a network. One such network topology is a ring. Different types of transport technologies can be used on a ring network. One class of these transport technologies relies on multiplexing (e.g., time division multiplexing (TDM), wave division multiplexing (WDM), dense wave division multiplexing (DWDM), etc.).

An optical standard such as Synchronous Optical Network (SONET) or Synchronous Digital Hierarchy (SDH) in conjunction with a multiplexing scheme is used to deliver various rates of traffic over a single high-speed optical fiber. SONET/SDH is a transmission standard for optical networks that corresponds to the physical layer of the open standards institutes (OSI) network model. One of the protection schemes for SONET/SDH in a ring network involves automatic protection switching (APS) in a bidirectional line switched ring (BLSR) architecture. There are different types of BLSR, including two fiber and four fiber. In addition to BLSR, there is also a uni-directional line switched ring (UPSR) architecture.

Standard BLSR Concatenations

A ring network can be operated by implementing a multiplexing ring transport protocol on a number of network elements that participate as nodes of the ring network. These network elements are connected by spans to form the ring. When using BLSR, each of these spans includes two "sub-spans" on which traffic travels in opposite directions on a number of time slots (referred to herein as channels). The channels in each direction include a set of working channels and a set of protecting channels. Thus, each node has at least two ports, each of which is connect to a different span of the ring. In addition, each of these ports has a receiving side and a transmitting side to which are respectively connected the incoming and outgoing sub-spans.

FIG. 1A illustrates a SONET OC-12 BLSR ring carrying exemplary traffic according to the prior art. In particular, FIG. 1A shows 4 nodes labeled 1–4, where nodes 1 and 3 are each connected to nodes 2 and 4 by different spans to form a ring. FIG. 1A also shows working traffic 110, extra traffic 120, and working traffic 130. The term working traffic is used to refer to traffic carried on a circuit provisioned on the working channels, whereas extra traffic refers to traffic carried on a circuit provisioned on the protecting channels. As is known in the art, extra traffic is preempted during a protection switch.

Since the spans of a BLSR each include two sub-spans which carry traffic in opposite directions, the same direction sub-spans form two "sub-rings" each carrying traffic in the opposite direction.

A circuit is provisioned through the ring 100 by installing cross-connects. For a given circuit, the node within which a cross-connect is installed to add traffic from outside of the ring is referred to as the add node (e.g., for the circuit carrying the working traffic 130 from node 1 to node 3, node 1 would be the add node for that traffic). In contrast, the node within which the cross-connect is installed to drop traffic from the ring is referred to as the drop node (e.g., again, for the circuit carrying the working traffic 130 from node 1 to node 3, node 3 is the drop node). Any node within which a cross-connect is installed that passes traffic from one span to another is referred to as a pass-through node (e.g., for the circuits carrying the working traffic 130, node 4 acts as a pass-through node).

Since the bandwidth requirements for a given circuit may be greater than a single one of the channels, multiple channels can be concatenated together. Thus, each circuit provisioned on a ring has associated therewith a concatenation size. With respect to the example of FIG. 1A, the: 1) working traffic 110 travels on a circuit provisioned on the working channels 1–3, and therefore that circuit has a concatenation size of 3 channels ("3C"); 2) the extra traffic 120 travels on a circuit provisioned on the protecting channels 7–9, and therefore that circuit has a concatenation size of 3C; and 3) the working traffic 130 is carried on a circuit provisioned on the working channel 4, and therefore that circuit has a concatenation size of 1.

In a standard BLSR ring, any use of the working channels configured on a sub-span must be configured on all sub-spans around the ring, and also must be mirrored in the protection channels. For example, if a 3C is configured on a particular set of working channels of any sub-span, then: 1) that 3C must be configured on the same working channels of every one of the sub-spans of the ring; and 2) a corresponding 3C must be preconfigured on the corresponding protection channels of all of the sub-spans of the ring. FIG. 1B illustrates the concatenation configuration for all of the sub-spans of FIG. 1A. In particular, FIG. 1B shows that in an OC-12 ring there are 6 working channels (1–6) and 6 protecting channels (7–12). Each of the protecting channels corresponds to one of the working channels (channel 7 corresponds to channel 1, channel 8 corresponds to channel 2, and so on). The concatenation configuration for a standard BLSR ring identifies the usage of STS and concatenated STS sized components. Thus, FIG. 1B shows the 3C concatenation of the working channels 1–3 (which in FIG. 1A are used between nodes 1 and 2) and its corresponding 3C concatenation mirrored in the protecting channels 7–9 (which in FIG. 1A is used between nodes 4, 3 and 2). In addition, FIG. 1B shows that the working channel 4 is configured as a 1C (which in FIG. 1A is used between nodes 1, 4, and 3).

Thus, the concatenation configuration for a standard BLSR ring is ring based in that it is the same for every sub-span of the ring. To accommodate the concatenation configuration for the ring, the receiving side of the ports of each node connected to spans of ring are programmed with the ring's concatenation configuration. In addition, each node stores a copy of the ring's concatenation configuration so it may reprogram its ports when the system is rebooted or when the line card on which a port resides is replaced. Since the concatenation configuration is the same around the ring and is mirrored in the protecting channels, only a single copy of the concatenation configuration for the working channels of one sub-span needs to be stored in each node.

When there is a failure in a span of the ring, a protection switch is performed. The failure of a span will be recognized by the 2 nodes connected to that span (these nodes are referred to as the switching nodes). These 2 nodes signal the need for a protection switch by transmitting messages.

Specifically, each of these nodes transmit messages to each other along the long path (the path that does not include the failed span) and the short path (the path that includes the failed span). The nodes not directly connected to the failed span (referred to as the bridging nodes) will inspect the long path messages as they pass through them. As is well known in the art, responsive to the protection switch, the working traffic on the failed span is switched to the protecting channels of the non-failed spans. The working bandwidth of any span can be switched to the protecting channels of any other span because the same concatenation configuration is configured on the working channels of every span, and that same concatenation configuration is mirrored on the protecting channels. Responsive to the failure being corrected, a protection un-switch is performed as is known in the art.

A disadvantage of the system described in FIGS. 1A–B is that it often does not allow for optimal usage of the ring's bandwidth. For example, while a 3C concatenation between nodes 1 and 2 may be needed, that 3C concatenation may not be optimal for circuit(s) to be provisioned between nodes 1, 4, and 3. More specifically, in the example of FIG. 1A, a circuit with a size of 1C was configured for the working traffic 130. However, this 1C could not use the working channels 1–3 because they must be provisioned as a 3C concatenation to support the circuit carrying the working traffic 110. That is why the circuit carrying the working traffic 130 is provisioned on the working channel 4. While the working traffic 110 and 130 illustrate a limitation with regard to the provisioning of circuits on the working channels, a similar limitation exists with regard to the provisioning of circuits on the protecting channels. In particular, since a circuit with a 3C concatenation was configured between the nodes 1 and 2 for the working traffic 110, there is a mirroring 3C concatenation preconfigured on the corresponding protecting channels 7–9 all the way around the ring (on both sub-rings). However, whether or not a 3C concatenation is required for a particular circuit provisioned on the protecting channels, a 3C concatenation must be used to utilize the protecting channels 7–9.

As more circuits are provisioned on a ring, these concatenation requirements make it harder or impossible to make full use of all of the ring's bandwidth. For example, where a smaller size would suffice, a larger sized concatenation may need to be used because of other circuits provisioned on the ring. Similarly, where a larger sized concatenation would allow for more optimal use, a combination of smaller sets of channels may need to be utilized because of circuits already provisioned on the ring.

Network Element and Ring Network Information Generation and Distribution

In order for a ring network to operate, network element information and ring network information must be generated and stored in each of the nodes of the ring. Various schemes can be used for generating and distributing this information, including a centralized scheme and a distributed scheme.

FIG. 2 illustrates a centralized scheme for generating and distributing the network element and ring network information according to the prior art. In particular, FIG. 2 illustrates a BLSR ring composed of 4 nodes labeled 1–4. The nodes 1–4 in FIG. 2 are oriented in the same manner as the nodes 1–4 in FIG. 1A. In addition, FIG. 2 shows the opposite direction sub-spans of each span of the ring. FIG. 2 also illustrates a network management system 220 in communication with each of the nodes 1–4.

In Block 200 of FIG. 2, the ring illustrated in FIG. 2 is planned. This planning includes the generation of the network element information and ring network information.

The network element information includes things such the network elements that will participate as nodes of the ring, the APS node IDs for those nodes, the line cards and ports within each of those network elements that will be connected to spans of the ring, the initial cross-connections to be installed, etc. In contrast, the ring network information includes things such as the ring map, the initial squelch table for each node, etc. From Block 200, control passes to Block 210.

In Block 210, the ring is physically built and the network element and ring network information is entered into the network management system 220. From Block 210, control passes to Block 230. In Block 230, the appropriate network element and ring network information is pushed down to each of the network elements participating in the ring.

One disadvantage to this centralized scheme is that the process of entering the information into the network management system 220 is time consuming and can be subject to human error. Another disadvantage of the centralized scheme is its lack of scalability. For example, each time a circuit is provisioned or unprovisioned from a ring, the squelch tables of each node of that ring must be updated and those updates must be distributed by the network management system 220. Since, it is typical for a given network management system to manage many rings, the network management system can be overwhelmed.

In contrast to the centralized scheme, in a distributed scheme, the nodes of the ring intercommunicate to generate and distribute the ring map and squelch tables. While techniques for distributively generating a ring map and a squelch table for a ring are known, these techniques are not robust in that they do not take into account span failures and how to handle partially built rings.

BRIEF SUMMARY OF THE INVENTION

A method and apparatus for implementing heterogeneous connections on a bi-directional line switched ring is provided. In one embodiment of the invention, a network element is to be coupled to a first and second span of a number of spans that interconnect a set of network elements to form a ring network. In addition, each of the spans has two sub-spans on which traffic travels in opposite directions on a number of channels that circumvent the ring. Additionally, the channels on each sub-span include working channels and protecting channels. Furthermore, the network element includes a traffic handler to reprogram, responsive to protection switches and un-switches, the connection configuration on the protecting channels of the sub-spans of the first and second spans that provide traffic to the network element.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

Figure 1A:
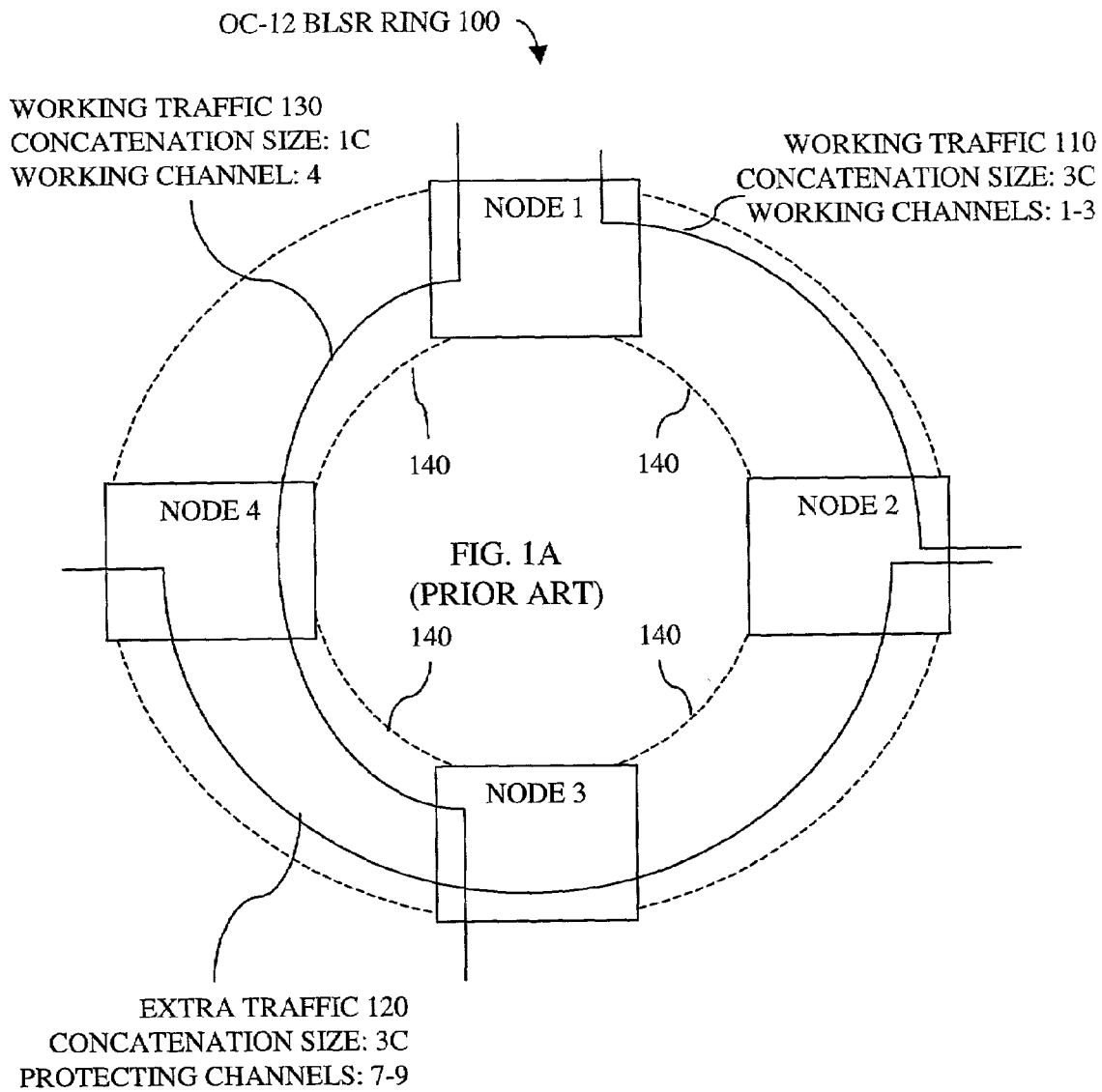
FIG. 1A illustrates a SONET OC-12 BLSR ring carrying exemplary traffic according to the prior art.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

The techniques shown in the figures can be implemented using hardware code, and/or data stored and executed on computers and/or network elements. Such devices store and/or communicate (internally and with other such devices over the network) code and/or data using machine-readable media, such as magnetic disks; optical disks; random access memory; read only memory; flash memory devices; electrical, optical, acoustical or other form of propagated signals (e.g., carrier waves, infrared signals, lasers, digital signals, etc.); etc. Of course, one or more parts of the invention may be implemented using any combination of software, firmware, and/or hardware.

Exemplary Application

One aspect of the invention is the implementation of different concatenation configurations with or without mirroring on a modified version of a BLSR. The level of granularity with which different concatenations can be applied is dependent on the implementation of the invention. In addition, each level of granularity can be implemented with or without mirroring (i.e., with or without the concatenation configuration on the protecting channels mirroring that on the working channels). The ability to program different concatenation configurations allows for a more optimal use of the ring network by enabling the most appropriately sized and positioned (i.e., which channels) concatenations to be used.

For example, one embodiment provides for different concatenation configurations on a per sub-span basis without mirroring. Thus, a different concatenation configuration can be used for the working and/or the protecting channels on every sub-span of the ring. In addition, both uni-directional and bidirectional circuits can be provisioned. With respect to provisioning both uni-directional and bi-directional circuits, the support for the different concatenation configurations on a per sub-span basis without mirroring allows for the provisioning those circuits, without requiring the configuring of those circuits' concatenations all the way around the ring or mirroring them in the protecting channels. Also, with respect to the provisioning of a uni-directional circuit on a given set of one or more sub-spans, the support for the different concatenation configurations on a per sub-span basis also removes the requirement for configuring that uni-directional circuit's concatenation on the opposite direction sub-spans.

By way of another example, one alternative embodiment provides for different concatenation configurations on a per sub-span basis with mirroring. In this embodiment, for a given sub-span, the concatenation configuration on the protecting channels must mirror that on the working channels of the same sub-span. Other alternative embodiments provide for different concatenations configurations on a per span basis either with or without mirroring. In these embodiments, for a given span, the concatenation configurations on the working channels of both sub-spans must be the same. Still other alternative embodiments provide for different concatenations configurations on a per sub-ring basis with or without mirroring. In these embodiments, for a given sub-ring, the concatenation configurations on the working channels of every sub-span must be the same. Yet another alternative embodiment requires the same concatenation configuration of the working channels on every sub-span, but does not require mirroring. In this embodiment, the concatenation configuration on the working channels can be different from that on the protecting channels, but the same concatenation configuration must be on the working channels of every sub-span and the same concatenation configuration must be on the protecting channels of every sub-span.

Figure 3A:
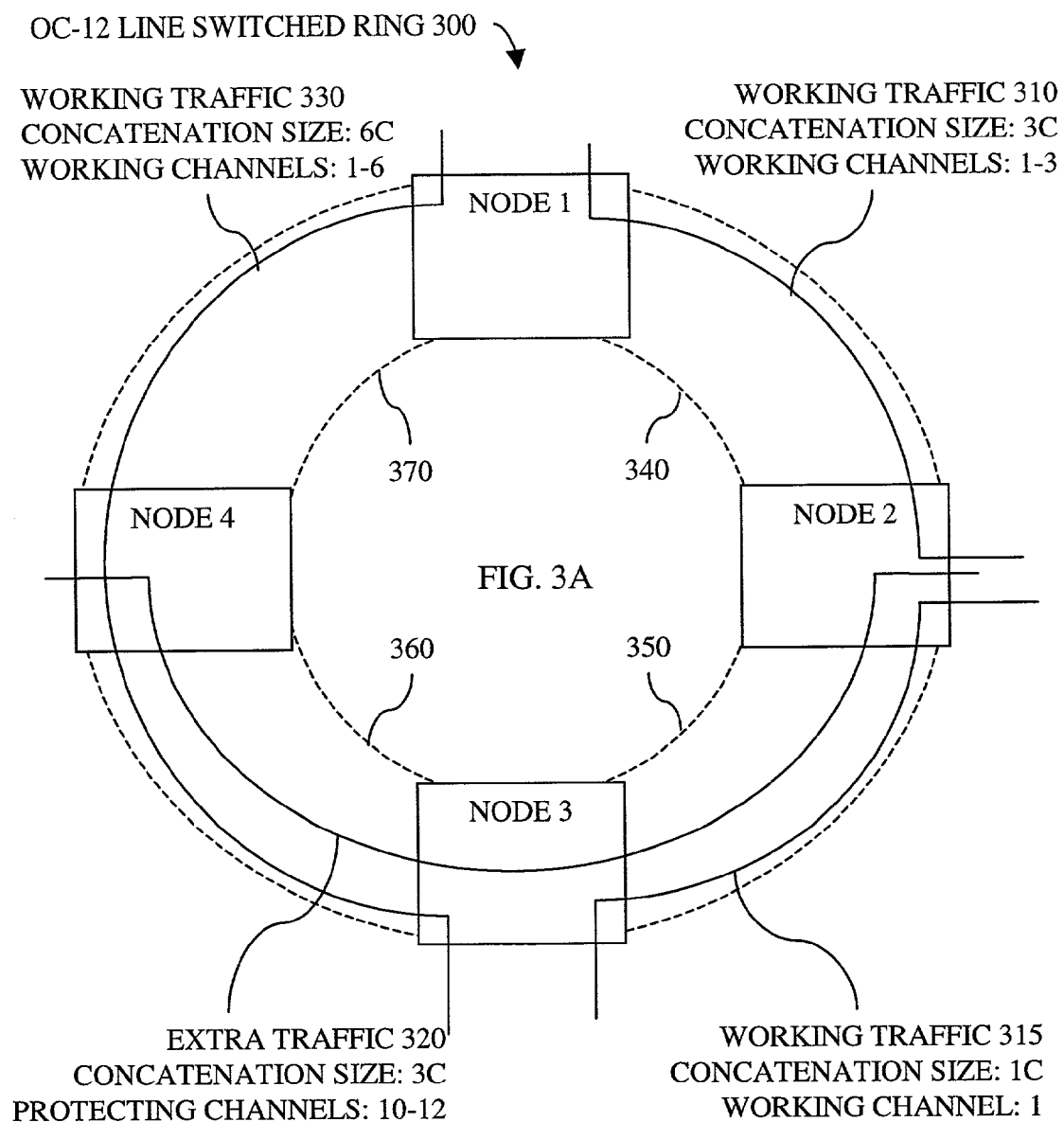
FIG. 3A illustrates an OC-12 line switched ring with exemplary heterogeneous concatenations according to one embodiment of the invention.
Figure 3B:
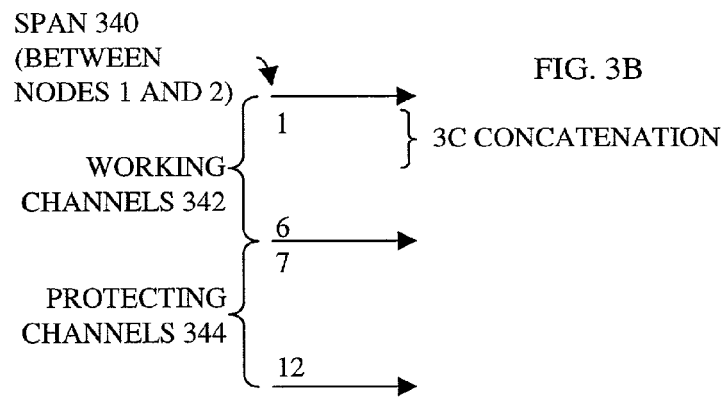
FIG. 3B illustrates the concatenation configuration of each of both the working and protecting channels of both of the sub-spans of span 340 according to one embodiment of the invention.
Figure 3C:
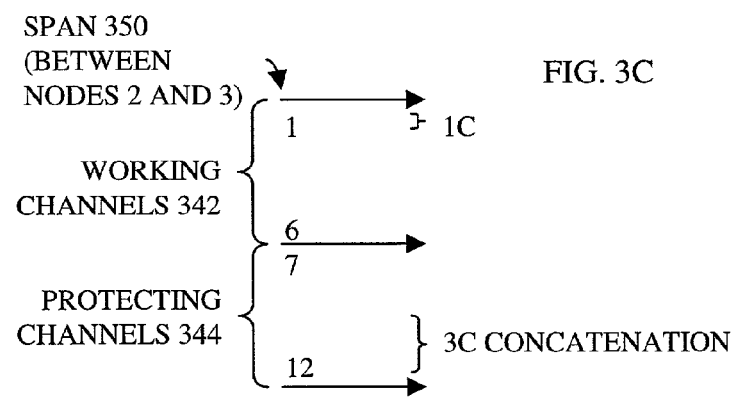
FIG. 3C illustrates the concatenation configuration of each of both the working and protecting channels of both of the sub-spans of span 350 according to one embodiment of the invention.
Figure 3D:
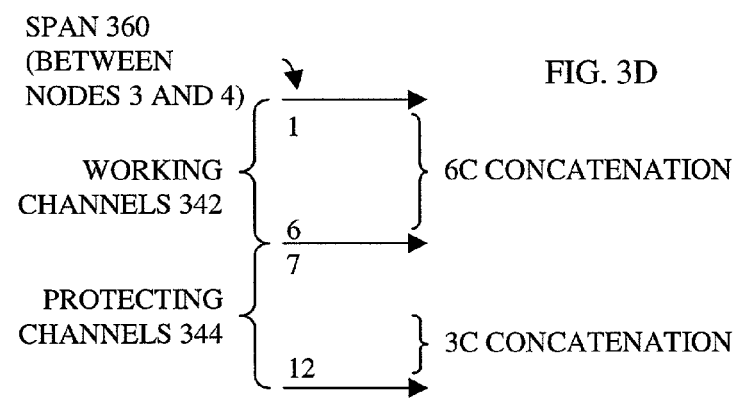
FIG. 3D illustrates the concatenation configuration of each of both the working and protecting channels of both of the sub-spans of span 360 according to one embodiment of the invention.
Figure 3E:
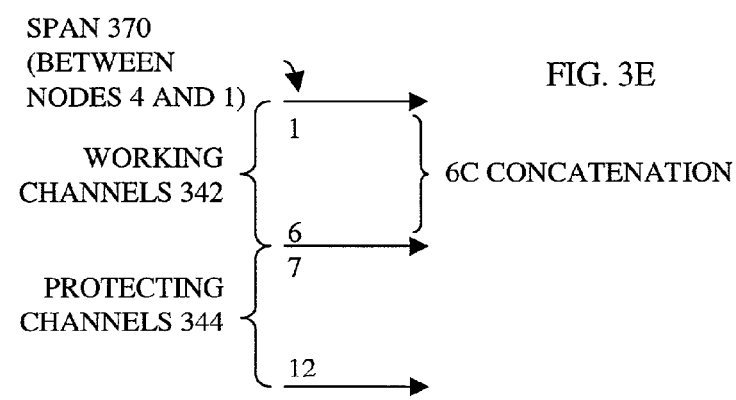
FIG. 3E illustrates the concatenation configuration of each of both the working and protecting channels of both of the sub-spans of span 370 according to one embodiment of the invention.

FIG. 3A illustrates an OC-12 BLSR with exemplary heterogeneous concatenations according to one embodiment of the invention. While FIG. 3A illustrates a OC-12 line switched ring, it should be understood that the invention is not limited to such a ring. For example, the invention is applicable to a different bandwidth size ring (e.g., OC-48, OC-192, etc.).

FIG. 3A illustrates 4 nodes labeled 1–4. While one embodiment is described with reference to a 4 node ring, it is understood that the invention can be applied to rings including any number of nodes. The nodes 1–4 are connected by spans 340, 350, 360, and 370 to form a ring network.

Additionally, FIG. 3A illustrates 4 circuits provisioned on the ring to transport working traffic 310, working traffic 315, extra traffic 320, and working traffic 330. The circuit carrying the working traffic 310 is provisioned on working channels 1–3 (a 3C concatenation) between nodes 1 and 2; the circuit carrying the working traffic 315 is provisioned on working channel 1 (a 1C) between nodes 2 and 3; the circuit carrying the extra traffic 320 is provisioned on protecting channels 10–12 (a 3C concatenation) between nodes 4, 3, and 2; and the circuit carrying the working traffic 330 is provisioned on working channels 1–6 (a 6C concatenation) between nodes 1, 4 and 3.

While in certain embodiments any one or all of these circuits may be unidirectional, it will be assumed that these circuits are bi-directional. Assuming that these circuits are bi-directional, FIG. 3A illustrates the varying of concatenation configurations on a per-span basis without mirroring. For example, working channel 1 is part of 3 different sized channels on the ring—a 3C concatenation between nodes 1 and 2; a 1C between nodes 2 and 3; and a 6C concatenation between nodes 3, 4 and 1. In addition, as opposed to the system in FIG. 1A in which the concatenation configuration on the working bandwidth must be mirrored in the protecting bandwidth, FIG. 3A shows that the concatenation configuration of the protecting channels can differ from the concatenation configuration programmed on the working channels of that span. Specifically, the circuit carrying the working traffic 330 is provisioned on channels 1–6 (a 6C concatenation), whereas the circuit carrying the extra traffic 320 is provisioned as a 3C concatenation of channels 10–12 (even though protecting channels 10–12 correspond to working channels 4–6). Since the circuits in FIG. 3A are bi-directional, FIGS. 3B–3E illustrate the concatenation configuration of each of both the working and protecting channels of both of the sub-spans of spans 340, 350, 360, and 370 according to one embodiment of the invention.

Heterogeneous Connections on a Bi-Directional Line Switched Ring

While the above-described exemplary application of the invention operates on STS and concatenated STS sized components, it should be understood that the invention is not limited to this. Rather, the mechanism described below can be used for other sized components. For this reason, the term "connection configuration" is used herein. A connection configuration identifies the usage of components on a set of channels. Thus, while a connection configuration typically includes the STS concatenation configuration for the set of channels, it is not limited to this size of components (STS and concatenated STS). For example, a connection configuration can also identify the usage of smaller sized components (e.g., VT and VT concatenations) for one or more STSs. Thus, to the extent that STSs are discussed below, it is understood that this is done for exemplary purposes.

Figure 4:
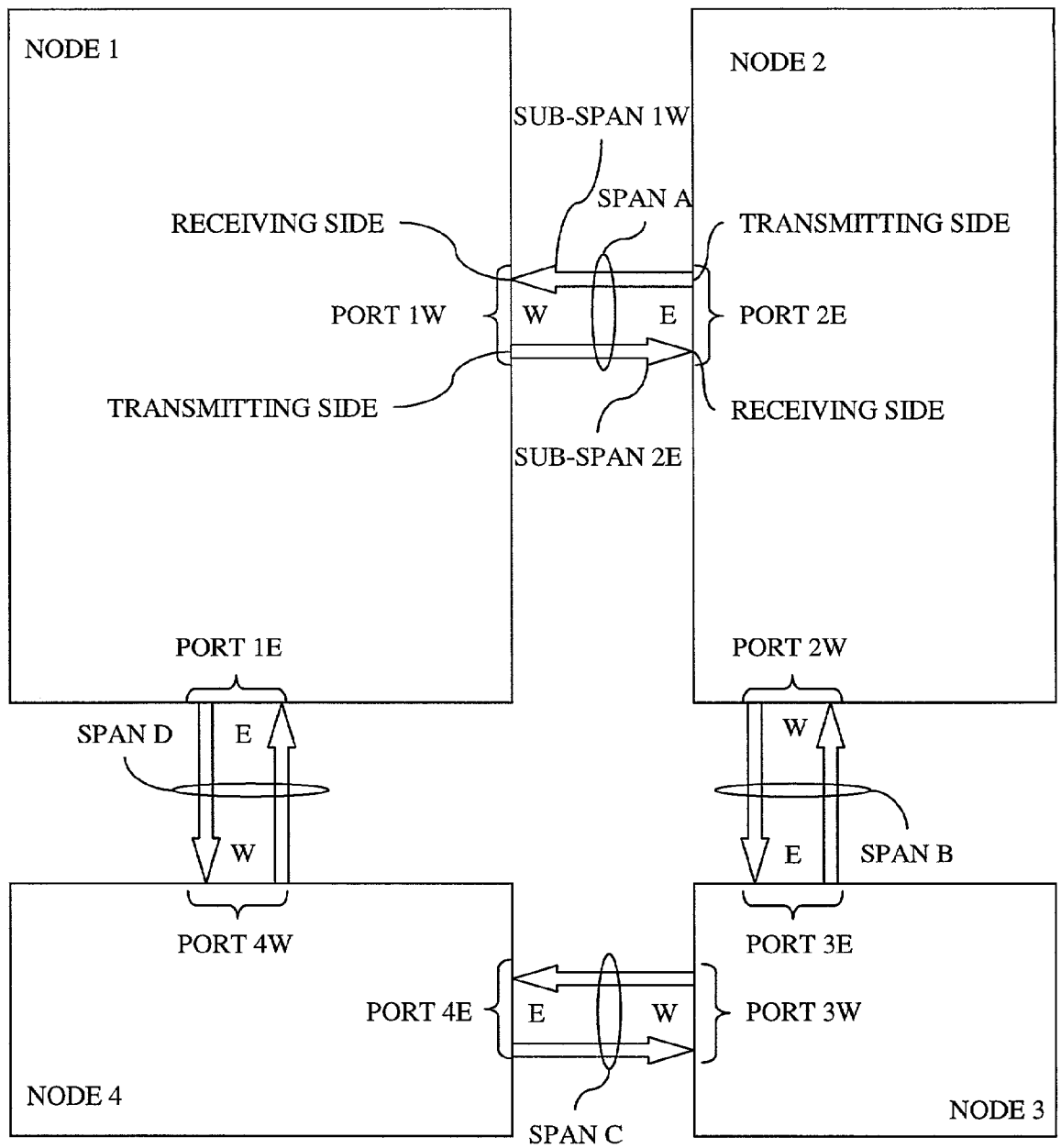
FIG. 4 is a blow up of a ring network according to one embodiment of the invention.

FIG. 4 is a blow up of a ring network according to one embodiment of the invention. Like FIG. 3, FIG. 4 illustrates a 4 node ring with the nodes labeled 1–4. However, the spans between nodes 1 and 2, nodes 2 and 3, nodes 3 and 4, and nodes 4 and 1 are respectively labeled A, B, C, and D. In addition, FIG. 4 illustrates the ports on each of the nodes coupled to the spans of the ring. The node number and an East (E)/West (W) labeling scheme are used to designate the various ports within the nodes that are connected to spans of the ring. In particular, span A is connected to ports 1W and 2E; span B is connected to ports 2W and 3E; span C is connected to ports 3W and 4E; and span D is connected to ports 4W and 1E. Each of these ports includes a receiving side and a transmitting side. In addition, each of the spans is illustrated broken into its 2 opposite direction sub-spans. The sub-spans are designated by the receiving side port label. Thus, the sub-span of span A connected to the receiving side of port 1W is referred to as sub-span 1W, whereas the sub-span of span A connected to the receiving side of port 2E is referred to as sub-span 2E.

Since different connection configurations may exist on different sub-spans and/or since mirroring may or may not be used, there is no guarantee that the connection configurations programmed on the protecting channels of any given sub-span will match those programmed on the working channels of another sub-span. To overcome this, when a protection switch occurs due to a failure of a given span, the connection configuration(s) of the protecting channels of the non-failing spans are reprogrammed to match the connection configuration(s) of the working channels programmed on the failed span. By way of example, assume that span B in FIG. 4 fails. Responsive to the protection switch, the traffic on the working channels of span B will be switched to the protecting channels of spans A, C and D. As a result, the connection configuration(s) on the protecting channels of the spans A, C and D must be reprogrammed to match the connection configuration(s) of the working channels programmed on the span B. When the failure is corrected and a protection un-switch is performed, the connection configuration(s) programmed on the protecting channels of spans A, C, and D prior to the protection switch must be restored.

To be more specific, when a protection switch occurs due to a failure on span B, the following occurs: 1) the traffic that would normally be transmitted on the working channels of the sub-span 3E must be switched by node 2 to travel on the protecting channels of the sub-spans 1W, 4W, and 3W; and 2) the traffic that would normally be transmitted on the working channels of the sub-span 2W must be switched by node 3 to travel on the protecting channels of the sub-spans 4E, 1E and 2E. As a result, on a protection switch due to a failure on span B, the protection channels of the different direction sub-spans of spans A, C, and D, get programmed thereon the connections of the working channels programmed on the opposite direction sub-span of span B, respectively.

In order to do this reprogramming, the nodes of the ring that are not connected to the failing span need to have the connection configuration(s) of the working bandwidth of the failed span. There are various techniques for providing this information. For example, such information could be included in the protection switch messages that are sent along the long path by the switching nodes. In contrast, other embodiments communicate the connection configuration information using other techniques in order to avoid overwhelming the communication channel with the additional information and/or remaining compatible with the existing standard format for the protection switch messages. As described later herein, in one embodiment of the invention, each node stores the needed connection configuration(s) for the working channels of every span (or sub-span) not directly connected to that node so that this information is already available when a protection switch occurs. The pre-storage of this information allows for a faster protection switch (e.g., the 50 millisecond requirement of standard BLSR). As described later herein, various mechanisms may be used to communicate this information to the nodes of the ring.

In addition to reprogramming the connection configuration(s) of the various sub-spans, the switching nodes must switch the traffic from the working channels of the failed span to the protecting channels of their non-failed span. This is done using well-known techniques.

Exemplary Implementation of Heterogeneous Connections on a Bi-Directional Line Switched Ring While various techniques can be used to apply the appropriate connection configuration(s) responsive to protection switches and un-switches, one exemplary technique will be described herein below with respect to FIG. 5. It should be noted that in the implementation illustrated in FIG. 5, the receiving side of port(s) of a node must be reprogrammed with the appropriate connection configuration responsive to a protection switch or un-switch; however, the transmitting side of port(s) need not be reprogrammed.

Figure 5:
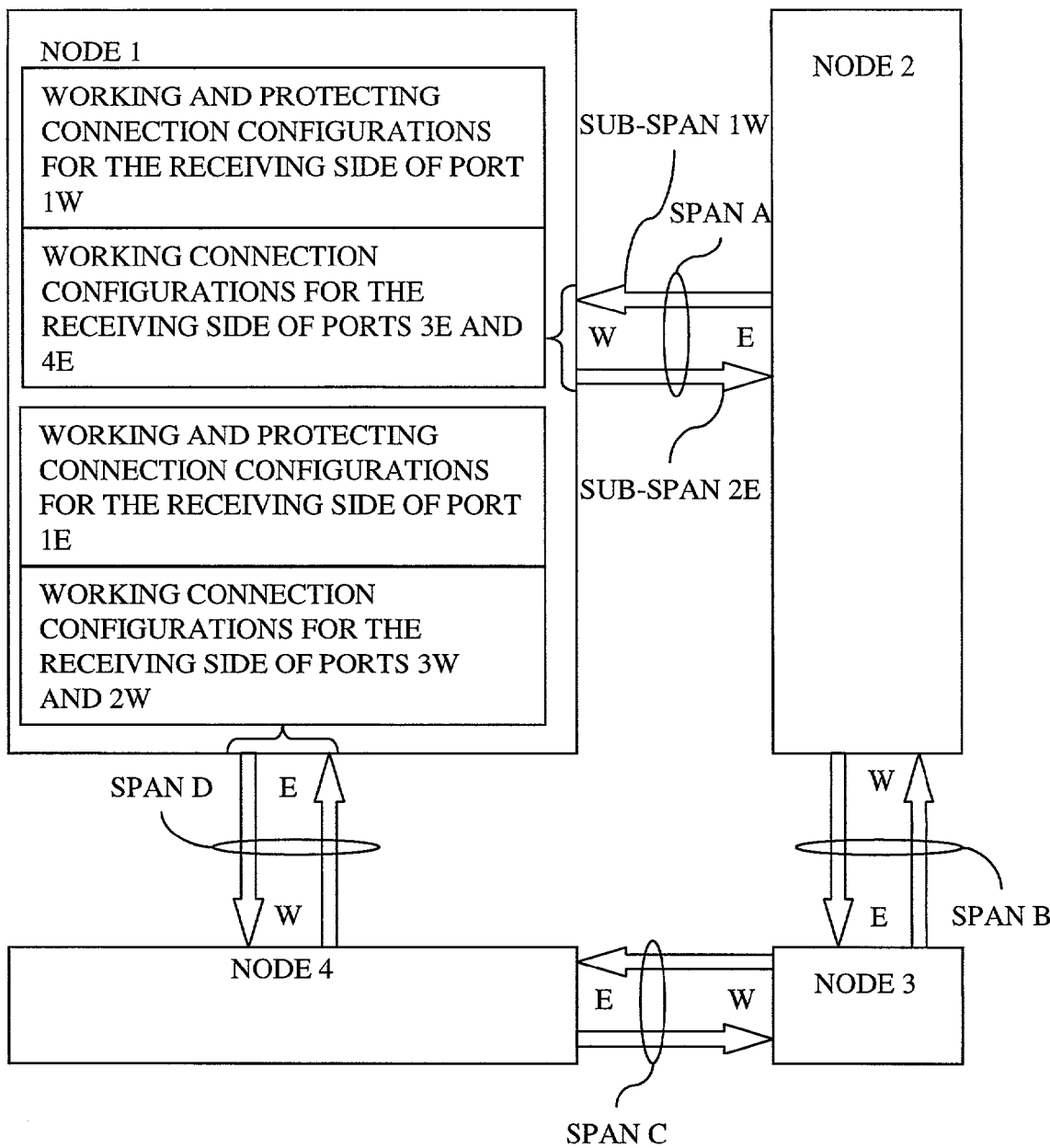
FIG. 5 illustrates an exemplary implementation of a ring network that provides for different connection configurations on a per sub-span basis without mirroring according to one embodiment of the invention.

FIG. 5 illustrates an exemplary implementation of a ring network that provides for different connection configurations on a per sub-span basis without mirroring according to one embodiment of the invention. In particular, FIG. 5 illustrates the same ring network from FIG. 4. However, in FIG. 5, specific information stored in node 1 is illustrated on a per port basis.

Figure 1B:
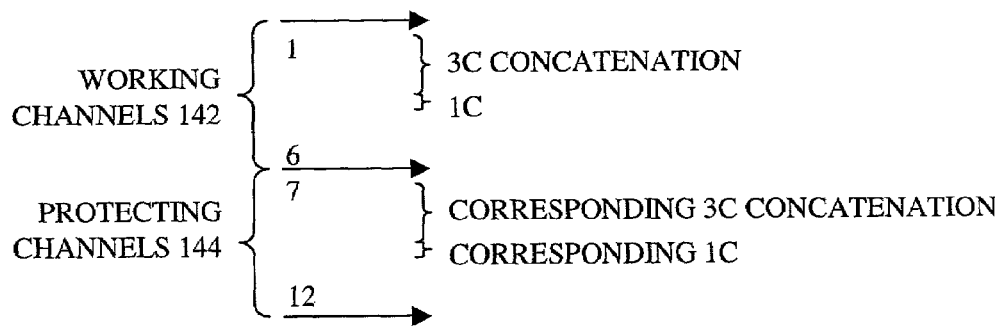
FIG. 1B illustrates the concatenation configuration for all of the sub-spans of FIG. 1A

As in FIG. 1A, a node in FIG. 5 must be able to reprogram its ports in the event of a system reboot or a line card replacement. However, each node in FIG. 1 need only store a single connection configuration for the working channels of a single sub-span because the same connection configuration is used on every sub-span and is mirrored in the protection channels. Whereas the nodes in FIG. 1A needed only store a single connection configuration for a single set of channels, each node in the system of FIG. 5 must store the connection configurations for multiple sets of channels and these connection configurations are also used to reprogram ports during protection switches and un-switches.

For example, node 1 of FIG. 5 stores the connection configurations for the working channels on the receiving side of both of its ports 1W and 1E. These connection configurations are stored not only to reprogram these ports in the event of a system reboot or line card replacements, but to reprogram these ports responsive to protection switches during which node 1 is acting as a switching node. For example, where span A fails and a protection switch occurs during which node 1 acts as a switch node, node 1 reprograms the protecting channels on the receiving side of port 1E with the connection configuration of the working channels from the sub-span 1W.

Node 1 of FIG. 5 also has stored therein the protecting channels on the receiving side of both of its ports 1W and 1E. These connection configurations are not only to reprogram these ports in the event of a system reboot or line card replacement, but are also used to reprogram these ports responsive to a protection un-switch. For example, responsive to protection un-switch due to a prior failure of span A, node 1 reprograms the protecting channels on the receiving side of port 1E with its original connection configuration.

In addition to these connection configurations, node 1 also has stored therein for port 1W the working bandwidth connection configurations for the receiving side of the ports 3E and 4E. This information is stored for the programming of the port 1W responsive to a protection switch due to a failure of the sub-span 3E and 4E, respectively. Similarly, node 1 has stored therein for port 1E the working bandwidth connection configurations for the receiving side of ports 3W and 2W. This information is stored for the reprogramming of the port 1E responsive to a protection switch due to a failure on the sub-spans 3W and 2W, respectively.

Table 1 below illustrates the manner in which the protecting channels on the receiving side of the various ports in the ring of FIG. 5 are reprogrammed responsive to a protection switch due to a failure on any one of the spans A–D. In particular, the top row of Table 1 shows the protecting channels on the receiving side of each port, while the leftmost row lists the failure of different spans. The entries within the table designate the sub-span from which the connection configuration of the working channels will be selected. Thus, each column identifies which working channel connection configuration will be selected for reprogramming the protecting channels on the receiving side of each port responsive to a failure of each span of the ring.

TABLE 1

| Protecting channels on the receiving Side of Port | 1W | 2W | 3W | 4W | 1E | 2E | 3E | 4E |
|---|---|---|---|---|---|---|---|---|
| Failure of Span A | X | 2E | 2E | 2E | 1W | X | 1W | 1W |
| Failure of Span B | 3E | X | 3E | 3E | 2W | 2W | X | 2W |
| Failure of Span C | 4E | 4E | X | 4E | 3W | 3W | 3W | X |
| Failure of Span D | 1E | 1E | 1E | X | X | 4W | 4W | 4W |

By way of example, on a protection switch due to a failure of span B, nodes 2 and 3 (the switching nodes) each send a message to each other by each direction around the ring. The message that is sent away from the failure (the long path) includes the source and destination nodes (nodes 3 and 2 respectively for node 3's message; node 2 and 3 respectively for node 2's message). This source and destination node information is used by the nodes to look up the connection configurations to reprogram the protection channels of the receiving side of their ports with. In one embodiment, the destination node identified by the long path protection switch message received by a port of a node is used to select the connection configuration for that port. For example, responsive to a failure on span B, port 1E of node 1 receives the long path message sent by node 3. This message indicates node 2 is the destination node. This indication of node 2 is used to select the working bandwidth connection configuration for the receiving side of port 2W (the working bandwidth connection configuration for sub-span 2W) to be programmed on the protecting channels of the receiving side of port 1E. Responsive to a protection un-switch, the protecting channels of port 1E are reprogrammed with the connection configuration that was there prior to the protection switch.

Thus, each node illustrated in FIG. 5 stores: 1) the connection configurations for the working channels providing traffic to that node (e.g., with respect to node 1, the sub-spans 1W and 1E); 2) the connection configurations for the protecting channels of the sub-spans providing traffic to that node (e.g., with respect to node 1, the protecting channels on sub-spans 1W and 1E); and 3) the connection configurations of the working channels of the sub-spans not directly connected to that node (e.g., with respect to node 1, the spans B and C).

Exemplary Implementation of a Network Element

Figure 6A:
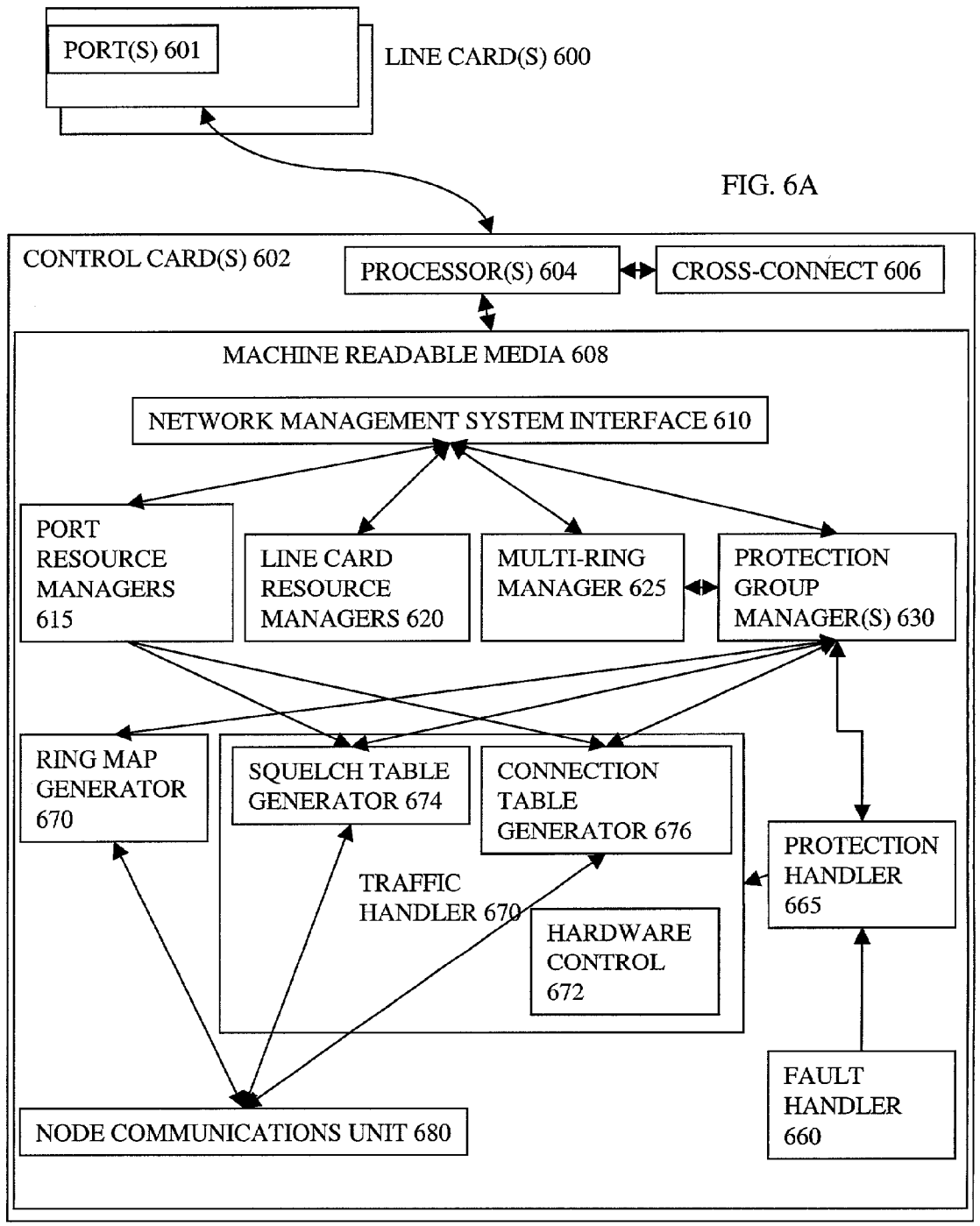
FIG. 6A is a block diagram illustrating an exemplary implementation of a network element according to one embodiment of the invention.

FIG. 6A is a block diagram illustrating an exemplary implementation of a network element according to one embodiment of the invention. While FIG. 6A illustrates a network element that supports a centralized cross-connect, it should be understood that a distributed cross-connect is within the scope of the invention. In addition, FIG. 6A illustrates a network element that can simultaneously support multiple rings. However, it is understood that a network element that supports a single ring is a subset, and therefore within the scope of the invention. In addition, while FIG. 6A illustrates hardware and firmware/software, it should be understood that the inventions described herein can be implemented with a variety of different distributions of workload between hardware, software, and/or firmware.

The network element illustrated in FIG. 6A includes a set of one or more redundant control card(s) 602. Each of these control card(s) 602 includes a cross-connect 606 and a set of one or more processors 604. The processors execute software and utilize data structures stored within one or more machine-readable media 608. In FIG. 6A, it is illustrated that the machine-readable media 608 is on each control card 602. However, it should be understood that this machine-readable media 608 may be distributed in a different fashion (located off the control cards and shared by all the control card(s) 602, etc.). Each of the control card(s) is connected to each of the line card(s) 600 installed in the slots of the network element. Each of the line card(s) 600 includes one or more ports 601.

The machine-readable media 608 includes data and code for operating one or more rings. Specifically, the machine-readable media 608 includes a network management system interface 610. The interface 610 allows commands to be received from and data to be transmitted to a location external to the network element (e.g., a terminal connected to the network element, a remote server, etc.). The interface 610 may support one or more protocols, such a CLI, TL1, a propriety protocol, etc.

The machine-readable media 608 also includes structures (e.g., "classes" in object oriented programming) of which instances (e.g., "objects" in object oriented programming) are created and maintained while operating the network element depending on what hardware and/or connections are installed. Specifically, the machine-readable media 608 includes port resource managers 615, line card resource managers 620, a multi-ring manager 625, and protection group managers 630.

The port and line card resource managers store the basic configuration information for the different line cards and ports installed in the network element. For example, the port resource manager for a port used for a line switched ring stores the necessary connection configuration information for that port when operating in a non-protection switch state (e.g., in a node that supports connection configuration on a per sub-span basis without mirroring, the connection configuration for the working and protecting channels of the receiving side of that port—with respect to port 1E of FIG. 5, this would include the connection configurations for the working and protecting channels on the receiving side of port 1E.). Of course, additional resource managers could exist for other physical items in the network element.

The multi-ring manager 625 stores a network element ID, as well as a ring ID/protection group ID pair for each ring provisioned in the network element. The network element ID is an ID assigned the network element to distinguish it from other network elements in the network. A ring ID is assigned to each ring provisioned in the network element. Thus, the ring ID is used to the differentiate rings running through the network element.

In addition, there is a protection group manager 630 created for each ring running through the network element. Each protection group manager is assigned a protection group ID to distinguish it from other protection group managers. The multi-ring manager 625 can therefore locate the corresponding protection group manager 630 for each ring, while the protection group managers 630 provide provisioning information to the multi-ring manager 625.

While various IDs are described herein for differentiating, locating, and/or associating different structures, it should be understood that this is merely a design choice. Thus, alternative embodiments may use other techniques (e.g., pointers).

Figure 6B:
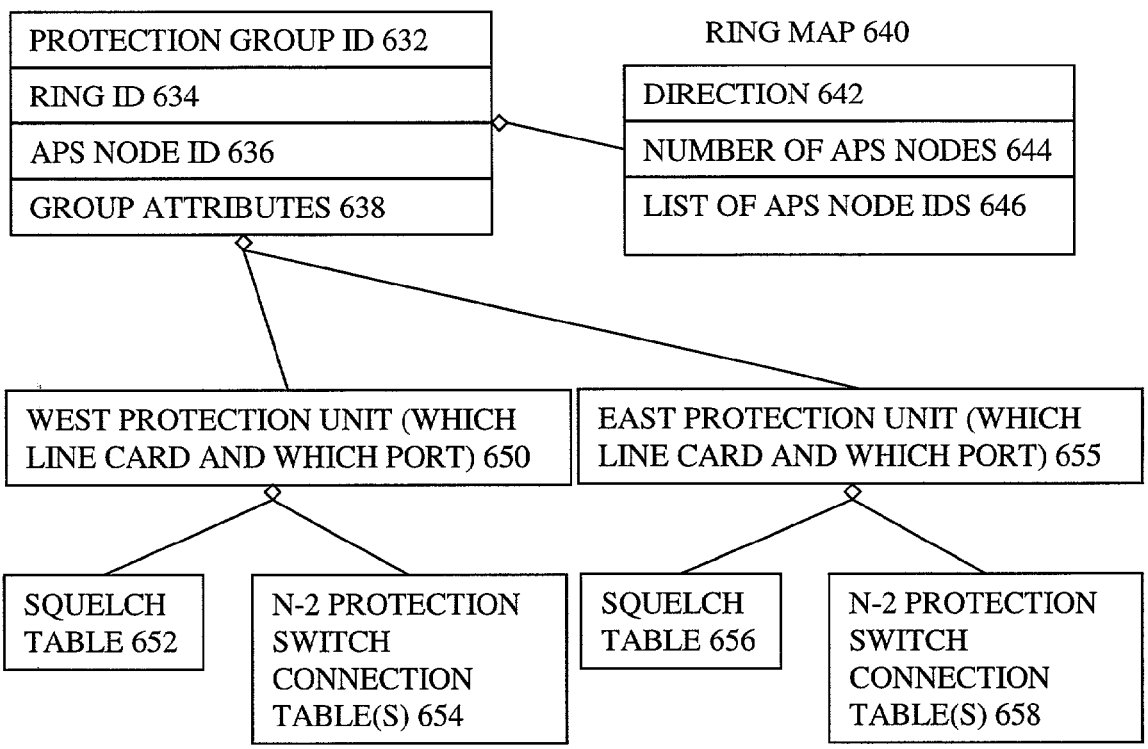
FIG. 6B illustrates an expanded view of an exemplary implementation of one of the protection group manager(s) 630 of FIG. 6A according to one embodiment of the invention.

FIG. 6B illustrates an expanded view of an exemplary implementation of one of the protection group manager(s) 630 of FIG. 6A according to one embodiment of the invention. The protection group manager 630A of FIG. 6B includes a protection group ID 632, a ring ID 634, an APS node ID 636, and group attributes 638. In BLSR, each node on the ring is assigned a different APS node ID. The APS node ID 636 identifies the APS node ID assigned to the network element for the ring identified by the ring ID 634. It should be noted that since multiple rings can pass through a network element architected according to FIG. 6A, a given network element may have multiple APS node IDs. The group attributes 638 represent other attributes that would be stored in this structure.

The protection group manager 630A also owns a ring map 640. While various techniques could be used to encode the information required by a ring map (a map that identifies the order of the APS nodes in the ring relative to this network element), the ring map illustrated in FIG. 6B includes a direction 642, the number of APS nodes 644, and an ordered list of the APS node IDs 646.

The protection group manager 630A also owns a west protection unit 650 and an east protection unit 655. These protection units identify which line card and which ports has been allocated to support the ring. In addition, the protection units 650 and 655 respectively own squelch tables 652 and 656. Squelch tables are well known in the art.

Furthermore, in one embodiment, the protection units 650 and 655 respectively own a set of N-2 protection switch connection tables 654 and 658, where N is the number of nodes in the ring. These tables store the necessary connection configuration information for the working channels of sub-spans not directly connected to the node (e.g., with respect to FIG. 5, for the port 1E, this would include the working connection configurations for the receiving side of the ports 3E and 4E). It should be noted that heterogeneous traffic can be supported using a number of different techniques, and the structures in FIG. 6B illustrate one such technique.

Returning to FIG. 6A, the network management system interface 610 allows for the configuring of the network element through the various managers described above.

Additional code is included that interacts with these managers to operate the network connections related thereto. In one embodiment, an instance of this additional code is instantiated for each ring currently provisioned in the network element. In particular, FIG. 6A also illustrates a fault handler 660 that reports faults (e.g., in the optical fiber, ports, line cards, etc.) to a protection handler 665. Based on the reports received from the fault handler 660 and the provisioning information in the protection group manager of the ring, the protection handler 665 would determine when protection switches and un-switches should be performed. The protection handler 665 communicates these protection events to a traffic handler 670. The traffic handler 670 includes hardware control 672 for controlling the hardware in the network element (including the cross-connect, various ports, etc.). Responsive to a protection switch, the traffic handler 670 selects the appropriate connection configuration(s) from the port resource managers 615 and/or the protection switch connection tables 654/658 and causes the hardware control 672 to apply them to the receiving side of the appropriate ports as necessary. In addition, responsive to a protection un-switch, the traffic handler 670 selects the appropriate connection configurations from the appropriate port resource manager(s) 615 and causes the hardware control 672 to apply them to the ports as necessary.

In addition, FIG. 6A illustrates a ring map generator 690, as well as the traffic handler 670 including a squelch table generator 674 and a connection table generator 676. Each of these generators communicates with other nodes of a ring through a node communications unit 680. In one embodiment, the node communications unit 680 uses the DDC channel to communicate amongst the nodes of the ring.

The ring map generators of the various network elements participating in a ring form a distributed program. Execution of this distributed program results in each node of the ring generating the information for its own ring map (to be stored in its protection group manager). Thus, the exemplary embodiment illustrated in FIG. 6A utilizes a distributed scheme for ring map generation.

Similarly, the squelch table generators of the various network elements participating in a ring form a distributed program. Execution of this distributed program results in each node of the ring generating the information for its own squelch tables (to be stored in its protection group manager). Thus, the exemplary embodiment illustrated in FIG. 6A utilizes a distributed scheme for squelch table generation. An exemplary implementation of the squelch table generators will be described later herein.

Similarly, the connection table generators of the various network elements participating in the ring provide for the communication of the necessary connection configurations amongst the nodes. An exemplary implementation of the connection table generator will be described later herein.

It should be understood that although the embodiment of the invention illustrated in FIG. 6A implements a distributed scheme for ring map generation, squelch table generation, and connection configuration communication, alternative embodiments may choose a different scheme for one or more of these functions. In addition, it should be understood that while certain data structures have been described with reference to FIGS. 4A and B, alternative embodiments of the invention could use different data structures storing more, less and/or different information that effectively associates certain physical resources and ring information with different rings passing through the network element.

Figure 7:
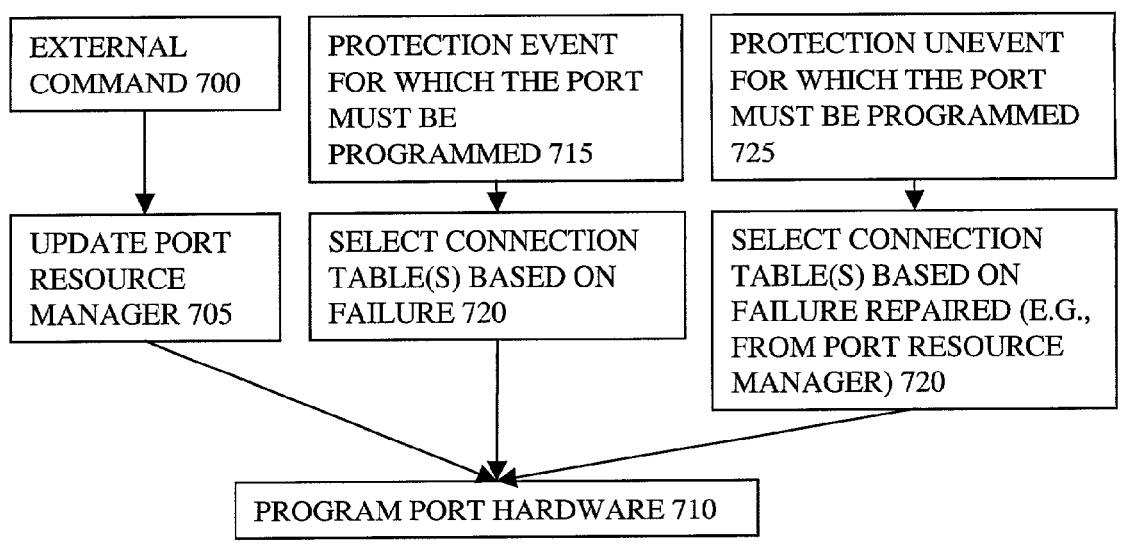
FIG. 7 is a flow diagram illustrating the various paths through which the port of a node is programmed according to one embodiment of the invention.

FIG. 7 is a flow diagram illustrating the various paths through which the port of a node is programmed according to one embodiment of the invention. In particular, FIG. 7 illustrates a first path which starts at Block 700. In Block 700, an external command is received by the node (e.g., by the network management interface 610 of FIG. 6A) and control passes to Block 705. In Block 705, the port's resource manager (e.g., see the port resource managers 615 of FIG. 6A) is updated according to the information contained in the external command and control passes to Block 710. In Block 710, the actual port hardware is reprogrammed (e.g., by the hardware control 672 in the traffic manager 670 of FIG. 6A).

A second path begins in Block 715. In Block 715, a protection event is signaled (e.g., a protection switch) for which the port must be reprogrammed and control passes to Block 720. In Block 720, the appropriate connection table is selected based on the protection event as previously described. From Block 720, control passes again to Block 710.

A third path begins at Block 725. In Block 725, a protection unevent occurs (e.g., a protection un-switch) for which the port must be reprogrammed and control passes to Block 720. In Block 720, the appropriate connection table is selected based on the failure that was repaired as previously described. From Block 720, control again passes to Block 710.

Exemplary Implementation of Network Element and Ring Network Information Generation and Distribution As previously indicated, various schemes can be used to generate and distribute network element and ring network information. In addition, it should be understood that the use of any one of these schemes to distribute connection configuration information to support heterogeneous connections is within the scope of the invention.

Figure 8:
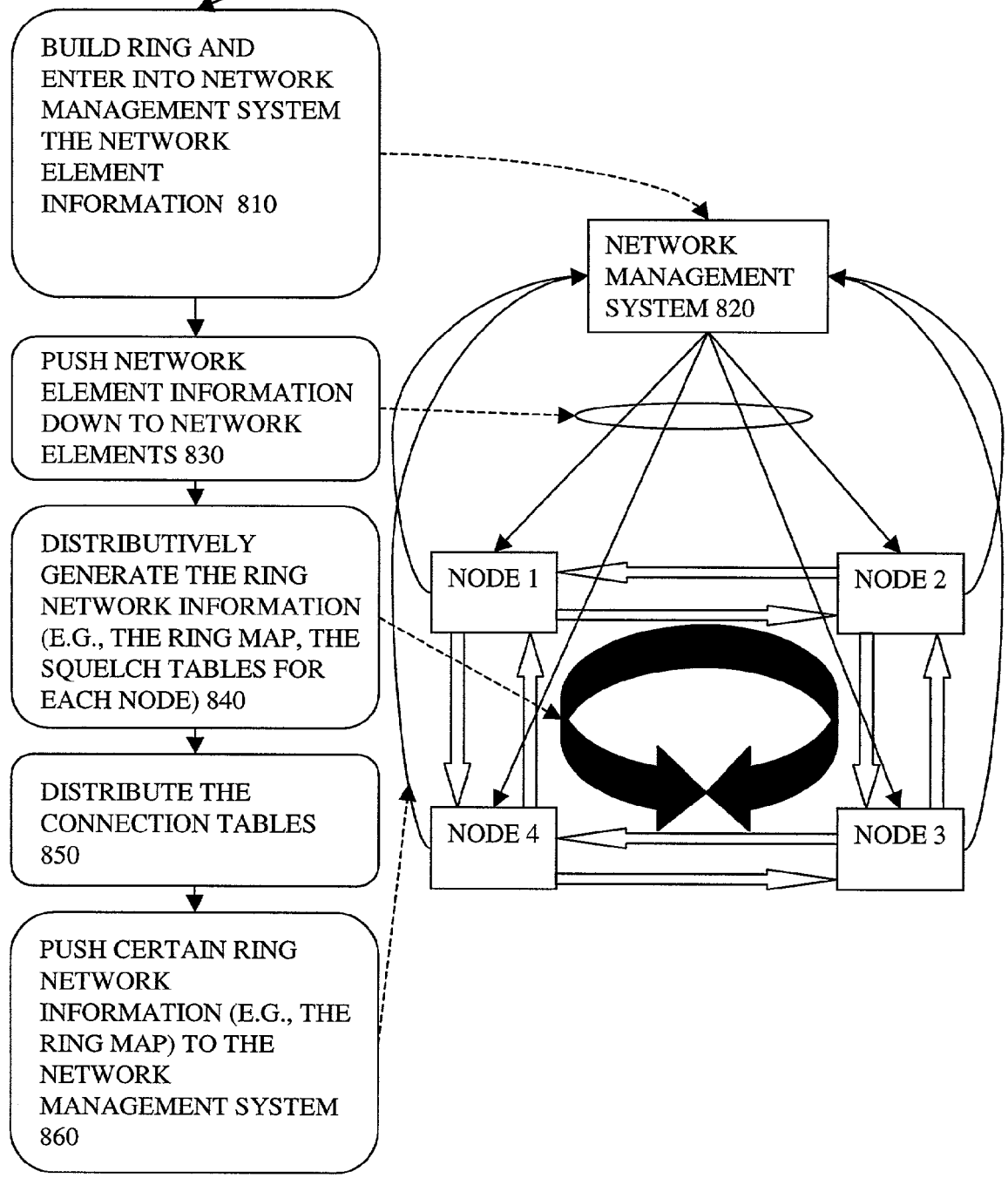
FIG. 8 illustrates an exemplary distributed scheme for generating and distributing network element and ring network information according to one embodiment of the invention.

FIG. 8 illustrates an exemplary distributed scheme for generating and distributing network element and ring network information according to one embodiment of the invention. In Block 800, the ring is planned. This planning includes the generation of the network element information and the ring map, but does not require the generation of squelch tables. From Block 800, control passes to Block 810.

Figure 2:
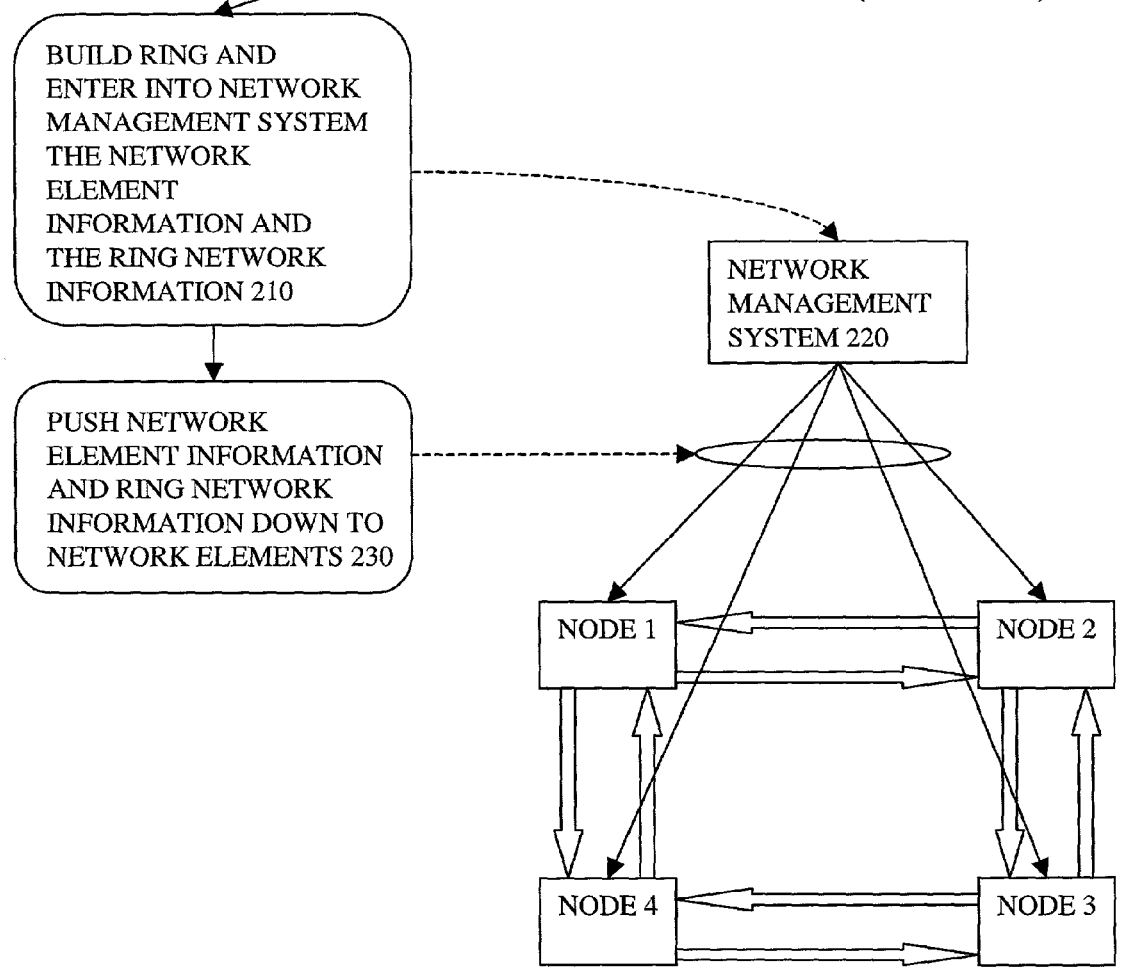
FIG. 2 illustrates a centralized scheme for generating and distributing the network element and ring network information according to the prior art.

In Block 810, the ring is built and the network element information is entered into a network management system 820. It should be noted that neither the ring map nor the squelch tables for each of the nodes needs to be entered into the network management system 820. In FIG. 8, the network management system 820 is in communication with each of the nodes of a 4 node ring having a similar configuration to that in FIG. 2. From Block 810, control passes to Block 830.

In Block 830, the network element information is pushed down to the network elements and control passes to Block 840. It should be noted that neither the ring map nor the squelch tables are pushed down from the network management system 820 to the nodes of the ring.

In Block 840, the ring network information is distributively generated by the nodes themselves intercommunicating with each other. This network information includes the ring map and the squelch tables for each node. From Block 840, control passes to Block 850.

In Block 850, the connection tables are shared by the various nodes as necessary. From Block 850, control passes to Block 860.

In Block 860, certain of the ring network information is pushed back up to the network management system 820.

Of course, certain of these blocks are repeated during operation of the ring (e.g., blocks 830–860).

Connection Table Distribution

Various techniques with the scope of the invention can be used for distributing the connection tables between the nodes of the ring (see Block 850). According to one exemplary scheme, when a node is added to a ring or when a node has been isolated and rejoins a ring, that node would transmit (e.g., via broadcast, multicast or unicast) a query message. In a system supporting different connection configurations on a per sub-span basis, the query message would include the working bandwidth connection configurations for the receiving side of the ports of that node. In response to receiving the query message, the other nodes of the ring would: 1) update their connection tables as necessary; and 2) reply (e.g., via multicast or unicast) with a message including the same information with respect to themselves.

Additionally, when a node changes a connection configuration for one of its ports as a result of executing an external command, then that node would transmit (e.g., via broadcast, multicast or unicast) a notify message to the other nodes of the ring. The notify message would contain the same connection configuration information as the query message, but would not cause a reply message to be transmitted back. Responsive to receiving a notify message, a node would update its connection tables with the new information.

ALTERNATIVE EMBODIMENTS

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. An apparatus comprising:
    a plurality of network elements;
    a plurality of spans interconnecting said plurality of network elements to form a ring, each of said plurality of spans having two sub-spans on which traffic travels in opposite directions;
    a multiplexing ring transport network protocol operating on said ring providing a plurality of channels on each of said sub-spans, each of said plurality of channels includes a set of working channels and a mutually exclusive set of protecting channels, wherein a first connection configuration programmed on a first set of channels is not the same as a second connection configuration programmed on a second set of channels because the first and second connection configurations identify one or more different concatenations of two or more components of said first and second sets of channels, where each of the concatenations of components carries data for a single circuit with a bandwidth greater than that of data carried by a single component, wherein said first set of channels and said second set of channels are respectively the set of working channels and the set of protecting channels, on a same one of said sub-sans, wherein the same connection configuration must be programmed on each of said sets of working channels on which traffic travels in the same direction as said first set of channels, and wherein a third connection configuration is programmed on each of said sets of working channels on which traffic travels in the opposite direction as first set of channels, and wherein said first and third connection configurations differ.

2. The apparatus of claim 1 wherein the same connection configuration must be programmed on each of said sets of working channels.

3. The apparatus of claim 1, wherein the same connection configurations must be programmed on the set of working channels of both sub-spans of any given one of said spans, and wherein the connection configurations programmed on the sets of working channels of two different ones of said spans are not same.

4. The apparatus of claim 1, wherein the connection configurations programmed on the sets of working channels of two different ones of said spans differ, and wherein the connection configurations programmed on the set of working channels of each of the sub-spans of at least one of said are not same.

5. The apparatus of claim 1, wherein said multiplexing ring transport protocol is a bi-directional line switched ring protocol.

6. A machine-readable medium providing instructions that, when executed by a set of one or more processors, cause said set of processor to perform operations comprising:
    receiving, at a node of a ring network, a first message indicating a protection switch, wherein said ring network operates on a plurality of network elements that participate as nodes of said ring network and that are connected by a plurality of spans to form a ring, each span including two sub-spans on which traffic travels in opposite directions on a plurality of channels, said plurality of channels in each direction including a set of working channels and a set of protecting channels; and
    responsive to said first message, reprogramming a receiving side of a first port of said node coupled to one of said sub-spans so that its protecting channels have programmed thereon the connection configuration of the working channels programmed on the opposite direction sub-span of a span identified by said first message, wherein said reprogramming also includes reprogramming a receiving side of a second port of said node coupled to the other direction sub-span of the ring relative to said first port, so that the protecting channels on that sub-span have programmed thereon the connection configuration of the working channels programmed on the opposite direction sub-span of the span identified by said first message.

7. The machine-readable medium of claim 6, wherein said operations further comprise:
    selecting from a storage or the connection configurations of the working channels of each of said plurality of spans the connection configuration used for said reprogramming.

8. The machine-readable medium of claim 6, wherein said operations further comprise:
    storing, prior to said receiving, the connection configurations of the working channels of each of the spans not directly connected to said node.

9. The machine-readable medium of claim 8, wherein said operations further comprise:
    receiving, prior to said storing, front said plurality of network elements said connection configurations.

10. The machine-readable medium of claim 6, wherein said operations further comprise:
    receiving, at said node, a second message indicating a protection un-switch; and
    responsive to said second message, reprogramming said receiving side of said first port to its state prior to the protection switch.

11. The method of claim 6, wherein said ring network is a BLSR ring.

12. An apparatus comprising:
    a plurality of network elements;
    a plurality of spans interconnecting said plurality of network elements to form a ring, each of said plurality of spans having two sub-spans on which traffic travels in opposite directions;
    a multiplexing ring transport network protocol operating on said ring providing a plurality of channels on each of said sub-spans, each of said plurality of channels includes a set of working channels and a mutually exclusive set of protecting channels, wherein a first connection configuration programmed on a first set of channels is not the same as a second connection configuration programmed on a second set of channels because the first and second connection configurations identify one or more different concatenations of two or more components of said first and second sets of channels, where each of the concatenations of components carries data for a single circuit with a bandwidth greater than that of data carried by a single component, wherein said first set of channels and said second set of channels are the sets of working channels on two different ones of said sub-spans, wherein said two different ones of said sub-spans are part of a same one of said spans, and wherein a third connection configuration is programmed on the set of working channels of a sub-span of a different one of said spans, and wherein said third connection configuration is not the sane as said first connection configuration.

13. The apparatus of claim 12, wherein said multiplexing ring transport protocol is a bi-directional line switched ring protocol.

* * * * *